May 15, 1951     S. W. HOOVER     2,552,971
CHERRY PITTER
Filed Feb. 2, 1949
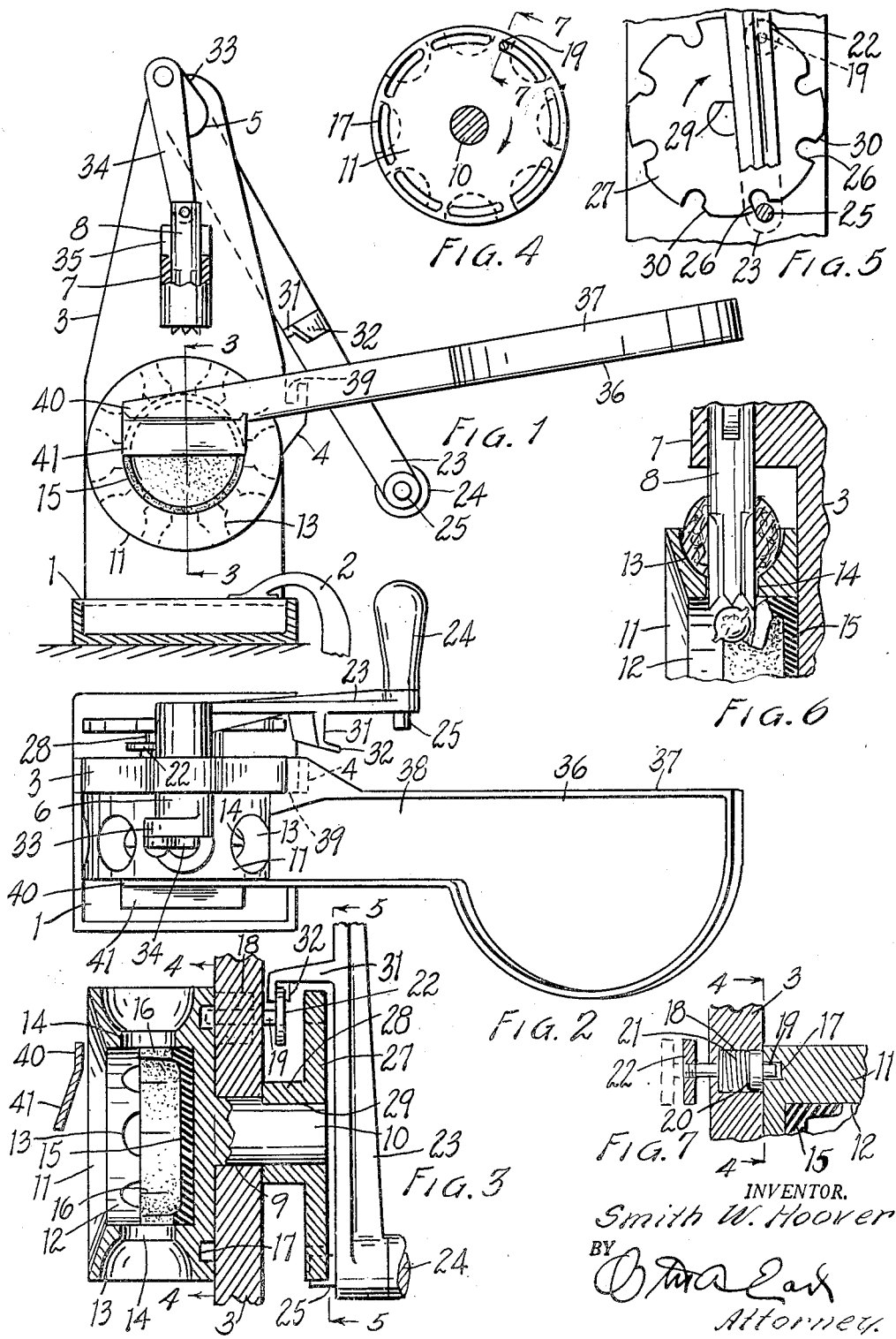
INVENTOR.
Smith W. Hoover
BY
Attorney.

Patented May 15, 1951

2,552,971

UNITED STATES PATENT OFFICE 2,552,971

CHERRY PITTER

Smith W. Hoover, Kalamazoo, Mich.

Application February 2, 1949, Serial No. 74,081

7 Claims. (Cl. 146—19)

This invention relates to improvements in cherry pitters.

The principal objects of this invention are:

First, to provide a cherry pitter of small size for domestic use which is extremely easy to operate and which will not jamb.

Second, to provide a novel form of fruit advancing mechanism which will positively locate each successive cherry in the proper position to be operated upon by a pitting plunger.

Third, to provide an automatically operating lock for the fruit advancing mechanism which prevents the mechanism from overrunning its proper operating position.

Fourth, to provide a cherry pitter, the entire operation of which is controlled by a simple crank.

Fifth, to provide a novel form of stripper mechanism for stripping the pit and loose fruit from the pitting plunger of a cherry pitting machine.

Sixth, to provide a cherry pitter which automatically ejects pits as they are separated from the cherries so as not to clog the mechanism or mix the pits with the pitted fruit.

Other objects and advantages relating to details of my invention will be apparent from a consideration of the following description and claims. The drawing, of which there is one sheet, illustrates a preferred form of my cherry pitter.

Fig. 1 is a side elevational view of my pitter with a portion partially broken away in vertical cross section to illustrate the mounting of the pit removing plunger.

Fig. 2 is a plan view of the pitter.

Fig. 3 is a transverse vertical cross sectional view through the pitter taken along the plane of the line 3—3 in Fig. 1 and illustrating the crank and fruit advancing drum at the start of a cycle of operation.

Fig. 4 is a cross sectional view taken along the plane between the adjacent surfaces of the fruit advancing drum and the body of the pitter as indicated by the line 4—4 in Figs. 3 and 4 and illustrating the inner face of the fruit advancing drum.

Fig. 5 is a fragmentary side elevational view partially broken away and illustrating the action of the operating crank in rotating the fruit advancing drum.

Fig. 6 is a fragmentary vertical cross sectional view illustrating the fruit drum and plunger in the middle of the pitting operation.

Fig. 7 is a fragmentary cross sectional view taken along the plane of the line 7—7 in Fig. 4 and illustrating the action of the drum locating lock.

My pitter consists of a flat base 1 adapted to rest upon the surface of a table as indicated in Fig. 1 and being secured thereto by a suitable C-clamp 2. Extending upwardly from the base 1 is a flat upright 3 having a forwardly projecting notched ear 4 formed on the forward edge thereof. The top of the upright is transversely bored as at 5 to form a journal for the crank shaft 6. Immediately below the bore 5 the upright 3 is provided with an integral boss 7 which is vertically bored to form a slideway for the pitting plunger 8. Below the boss 7 and vertically aligned therewith the upright 3 is transversely bored, as at 9 in Fig. 3, to form a journal for the shaft 10 of the fruit advancing drum 11.

The fruit advancing drum 11 is preferably formed integrally with the shaft 10 and is provided with a central recess 12 opening to the left side of the pitter as viewed in Fig. 3 and away from the upright 3. The periphery of the drum 11 is formed with a series of equally spaced fruit receiving pockets 13 and the bottoms of the pockets communicate with the central recess 12 through the holes 14. Positioned within the recess 12 is a cup-like rubber stripper member 15 which has its rim projecting approximately halfway across the inner ends of the holes 14. The rim of the stripper member is radially slotted, as at 16, opposite each of the holes 14.

The inner face of the drum 11 is provided with a series of arcuate slots or grooves 17 as is most clearly shown in Figs. 3 and 4. One groove is provided for each of the fruit receiving pockets 13 and holes 14 and each of the grooves terminate in the space between adjacent pockets. The trailing ends of the grooves form locating surfaces cooperative with a locating stop member to be described. The upright 3 is bored as at 18 near the periphery of the drum 11 and a locating pin 19 is positioned in the bore 18 and arranged to project successively into each of the slots 17. The pin 19 forms the stop member cooperative with the before mentioned locating surfaces. The pin 19 is provided with a shoulder 20 which slides in the bore 18 and forms one abutment for the coil spring 21 positioned against a shoulder in the bore. The outer end of the pin 19 projects through the upright to the crank side of the upright and is threaded to receive a cam engaging button 22.

The crank shaft 6 at the top of the upright is provided at its right end with a crank arm 23 having the operating handle 24 carried on the free end thereof. The free end of the arm 23 also carries the indexing pin 25 which projects inwardly toward the upright and away from the handle 24. As the crank 23 and handle 24 are rotated the indexing pin 25 is arranged to enter and engage the edge of successive indexing slots 26 formed in the periphery of an indexing wheel 27. The indexing wheel 27 is provided with a hub 28 nonrotatably secured to the right end of the drum shaft 10 by means of the cooperating flat surfaces 29 formed on the hub and shaft. It will be noted from Fig. 5 that the trailing edges of the indexing notches 26 are cut away as at 30 to permit free entrance of the indexing pin 25 into the notches.

Spaced radially inwardly of the handle 24, the crank arm 23 is provided with a laterally inwardly projecting bracket 31 which just clears the periphery of the indexing wheel as the crank arm is rotated. The bracket 31 carries a cam finger 32 which projects radially outwardly from the crank shaft 6 and radially inwardly of the drum shaft 10 to engage the cam button 22. It will be noted that the cam finger 32 is disposed obliquely with respect to the plane of rotation of the crank 23 so that as the crank 23 is rotated in a counterclockwise direction, as illustrated in Fig. 1, the cam finger 23 will engage and retract the button 22 and locating pin 19 from the locating slot 17 prior to engagement of the indexing pin 25 with the indexing slot 26.

The opposite end of the crank shaft 6 carries a crank arm 33 disposed over the boss 7 and a link 34 pivotally connects the arm 33 with the pitting plunger 8. It will be noted that the upper end of the boss 7 is vertically slotted as at 35 (see Fig. 1) to permit the necessary oscillation of the link 34 relative to the plunger. The throw of the crank arm 33 is such as to reciprocate the plunger 8 between a raised position as shown in Fig. 1 to a depressed position as shown in Fig. 6 in which the plunger projects through the hole 14 in the bottom of a fruit receiving pocket in the drum.

Starting with the plunger in raised position and with the operating crank arm 23 just approaching the indexing wheel 27, the cam finger 32 will first retract the locating pin 19 so that the fruit advancing drum and indexing wheel are free to rotate on the upright 3. Continued rotation of the crank 23 will engage the indexing pin 25 in one of the slots 26 and rotate the indexing wheel and fruit advancing drum until the cam finger 32 clears the button 22 and permits the locking finger 19 to advance into the next succeeding locating groove 17 on the fruit advancing drum. Continued rotation of the crank 23 will swing the pin 25 out of the indexing notch 26 and start to depress the plunger 8 toward the fruit advancing drum. The locating grooves 17 are so located with respect to the pin 19 and fruit pockets 13 that the end of each successive groove will engage the locating pin and stop the drum with a fruit receiving pocket properly located beneath the pitting plunger 8. Continued rotation of the crank 23 forces the plunger through a cherry located in the pocket 13 and forces the pit through the hole 14 into the recess 12 in the fruit advancing drum. The plunger 8 then retracts upwardly and the rim of the stripper member 15 springs outwardly to strip the pit from the plunger and eject the pit forcibly through the open side of the fruit advancing drum.

In order to feed cherries easily and individually to the successive fruit receiving pockets 13 I provide a generally flat tray 36 having a rim 37 converging to a feed chute 38. The tray 36 is provided on one edge with a depending flange 39 engageable in the notched ear 4 on the front of the body. The opposite edge of the rim 37 is provided with an extension 40 lapped upon the side of the drum 11 and turned downwardly and outwardly in a pit deflecting flange 41. The flange 41 serves to deflect pits ejected from the recess into a suitable receiver located alongside of the pitter.

The interconnected locating pin 19 and operating crank 23 permit the fruit advancing drum and indexing wheel to be freely rotatably mounted on the upright for ease of operation of the pitter without fear of having the fruit receiving pockets stop in a position which is not aligned with the plunger 8. The cup-like stripper member 15 effectively discharges pits from the pitter and keeps the plunger 8 in clean operating condition. The pitter can therefore be operated as fast as the operator cares to rotate the crank 23 and I have found that my pitter will conveniently pit an entire year's supply of cherries for an ordinary family in less than one hour.

Having thus described my invention, what I claim as new and desire to secure by Letters Patent is:

1. A cherry pitter comprising a base, an upright on said base, a boss on said upright forming a vertical plunger slideway, a crank shaft journaled in said upright above said boss and having an operating crank on one end thereof, a second crank on said shaft positioned over said boss, a pitting plunger mounted in said boss and link connected to said second crank, a fruit advancing drum rotatably mounted on said upright below said boss and having a plurality of fruit receiving pockets in its periphery, said drum having a central recess open to one side thereof and communicating with said pockets through radially extending holes, a cup-like stripper member of springable rubber material positioned in the recess of said drum and having its rim projecting part way over the holes between said recess and said pockets, an indexing wheel nonrotatably connected with said drum and positioned on the opposite side of said upright from said drum adjacent to said operating crank, said indexing wheel having a series of notches formed in the periphery thereof, an indexing pin carried on said operating crank successively engageable in said notches to advance said wheel and drum, a locating pin projecting through said upright and having an inner end biased toward said drum, the surface of said drum adjacent to said upright forming a series of arcuate locating grooves for receiving the inner end of said pin, a cam member on said operating crank engageable with said locating pin to retract said pin from said drum prior to movement of said indexing wheel by said operating crank, a feed tray removably supported on said upright and forming a feed chute to said pockets in said drum, and a flange on said tray projecting across the open end of said recess in said drum to deflect pits ejected by said stripper member.

2. A cherry pitter comprising a base, an upright on said base, a boss on said upright forming a vertical plunger slideway, a crank shaft journaled in said upright above said boss and having an operating crank on one end thereof.

a second crank on said shaft positioned over said boss, a pitting plunger mounted in said boss and link connected to said second crank, a fruit advancing drum rotatably mounted on said upright below said boss and having a plurality of fruit receiving pockets in its periphery, said drum having a central recess open to one side thereof and communicating with said pockets through radially extending holes, a cup-like stripper member of springable rubber material positioned in the recess of said drum and having its rim projecting part way over the holes between said recess and said pockets, an indexing wheel nonrotatably connected with said drum and positioned on the opposite side of said upright from said drum adjacent to said operating crank, said indexing wheel having a series of notches formed in the periphery thereof, an indexing pin carried on said operating crank successively engageable in said notches to advance said wheel and drum, a locating pin projecting through said upright and having an inner end biased toward said drum, the surface of said drum adjacent to said upright forming a series of arcuate locating grooves for receiving the inner end of said pin, a cam member on said operating crank engageable with said locating pin to retract said pin from said drum prior to movement of said indexing wheel by said operating crank, and a feed tray removably supported on said upright and forming a feed chute to said pockets in said drum.

3. A cherry pitter comprising a base, an upright on said base, a boss on said upright forming a vertical plunger slideway, a crank shaft journaled in said upright above said boss and having an operating crank on one end thereof, a second crank on said shaft positioned over said boss, a pitting plunger mounted in said boss and link connected to said second crank, a fruit advancing drum rotatably mounted on said upright below said boss and having a plurality of fruit receiving pockets in its periphery, said drum having a central recess open to one side thereof and communicating with said pockets through radially extending holes, an indexing wheel nonrotatably connected with said drum and positioned on the opposite side of said upright from said drum adjacent to said operating crank, said indexing wheel having a series of notches formed in the periphery thereof, an indexing pin carried on said operating crank successively engageable in said notches to advance said wheel and drum, a locating pin projecting through said upright and having an inner end biased toward said drum, the surface of said drum adjacent to said upright forming a series of locating grooves for receiving the inner end of said pin, a cam member on said operating crank engageable with said locating pin to retract said pin from said drum prior to movement of said indexing wheel by said operating crank, and a feed tray removably supported on said upright and forming a feed chute to said pockets on said drum.

4. A cherry pitter comprising a base, an upright on said base, a boss on said upright forming a vertical plunger slideway, a crank shaft journaled in said upright above said boss and having an operating crank on one end thereof, a second crank on said shaft positioned over said boss, a pitting plunger mounted in said boss and link connected to said second crank, a fruit advancing drum rotatably mounted on said upright below said boss and having a plurality of fruit receiving pockets in its periphery, said drum having a central recess open to one side thereof and communicating with said pockets through radially extending holes, a cup-like stripper member of springable material positioned in the recess of said drum and having its rim projecting part way over the holes between said recess and said pockets, an indexing wheel nonrotatably connected with said drum and positioned on the opposite side of said upright from said drum adjacent to said operating crank, said indexing wheel having a series of notches formed in the periphery thereof, an indexing pin carried on said operating crank successively engageable in said notches to advance said wheel and drum, a locating pin projecting through said upright and having an inner end biased toward said drum, the surface of said drum adjacent to said upright forming a series of locating grooves for receiving the inner end of said pin, and a cam member on said operating crank engageable with said locating pin to retract said pin from said drum prior to movement of said indexing wheel by said operating crank.

5. A cherry pitter comprising a base, an upright on said base, a boss on said upright forming a vertical plunger slideway, a crank shaft journaled in said upright above said boss and having an operating crank on one end thereof, a second crank on said shaft positioned over said boss, a pitting plunger mounted in said boss and operatively connected to said second crank, a fruit advancing drum rotatably mounted on said upright below said boss and having a plurality of fruit receiving pockets in its periphery, said drum having a central recess open to one side thereof and communicating with said pockets through radially extending holes, an indexing wheel nonrotatably connected with said drum and positioned on the opposite side of said upright from said drum adjacent to said operating crank, said indexing wheel having a series of notches formed in the periphery thereof, an indexing pin carried on said operating crank successively engageable in said notches to advance said wheel and drum, a locating pin projecting through said upright and having an inner end biased toward said drum, the surface of said drum adjacent to said upright forming a series of locating grooves for receiving the inner end of said pin, and a cam member on said operating crank engageable with said locating pin to retract said pin from said drum prior to movement of said indexing wheel by said operating crank.

6. A cherry pitter comprising a base, an upright on said base, a boss on said upright forming a vertical plunger slideway, a crank shaft journaled in said upright above said boss and having an operating crank on one end thereof, an eccentric element on said shaft positioned over said boss, a pitting plunger mounted in said boss and operatively connected to said element, a fruit advancing drum rotatably mounted on said upright below said boss and having a plurality of fruit receiving pockets in its periphery, said drum having a central recess open to one side thereof and communicating with said pockets through radially extending holes, an indexing wheel nonrotatably connected with said drum, said indexing wheel having a series of notches formed in the periphery thereof, an indexing pin carried on said operating crank successively engageable in said notches to advance said wheel and drum, a locating pin mounted in said upright and having an end biased toward said drum, the surface of said drum adjacent to said upright forming a series of locating grooves for receiving the inner end of said pin, and a cam member on said operating crank engageable with said locating pin to retract said pin from said drum prior to movement of said indexing wheel by said operating crank.

7. A cherry pitter comprising a base, an upright on said base, a boss on said upright forming a plunger slideway, a crank shaft journaled in said upright and having an operating crank on one end thereof, an eccentric element on said shaft, a pitting plunger mounted in said boss and operatively connected to said element, a fruit advancing drum rotatably mounted on said upright and having a plurality of fruit receiving pockets in its periphery, said drum having a central recess open to one side thereof and communicating with said pockets through radially extending holes, an indexing wheel nonrotatably connected with said drum and positioned adjacent to said operating crank, said indexing wheel having a series of notches formed in the periphery thereof, an indexing member on said operating crank successively engageable in said notches to advance said wheel and drum, a locating stop member mounted in said upright and having an end urged toward said drum, the surface of said drum adjacent to said upright having a series of arcuately spaced radially extending locating surfaces for engaging the end of said stop member, and a member on said operating crank cammingly engageable with said locating stop member to retract said stop member from said locating surfaces prior to movement of said indexing wheel by said indexing member.

SMITH W. HOOVER.

REFERENCES CITED

The following references are of record in the file of this patent:

FOREIGN PATENTS

| Number | Country | Date |
|--------|---------|------|
| 74,203 | Germany | Apr. 3, 1893 |
| 349,926 | France | May 19, 1905 |
| 85,196 | Switzerland | June 1, 1920 |
| 118,199 | Switzerland | May 2, 1927 |
| 693,267 | France | Aug. 19, 1930 |